United States Patent [19]

Kennedy-Skipton

[11] 4,114,384
[45] Sep. 19, 1978

[54] METHOD OF SECURING FIXING ELEMENTS IN ROCK

[75] Inventor: Henry Kinny Kennedy-Skipton, West Kilbride, Scotland

[73] Assignee: Imperial Chemical Industries Limited, London, England

[21] Appl. No.: 734,355

[22] Filed: Oct. 20, 1976

[30] Foreign Application Priority Data

Nov. 5, 1975 [GB] United Kingdom ............... 45925/75

[51] Int. Cl.$^2$ ............................................. E21D 11/00
[52] U.S. Cl. .................................... 405/260; 106/115; 106/315
[58] Field of Search ...................... 106/115, 315, 111; 61/36 C, 45 B; 52/744

[56] References Cited

U.S. PATENT DOCUMENTS

| Re. 23,873 | 9/1954 | Ludwig | 106/315 |
|---|---|---|---|
| 2,427,683 | 9/1947 | Ludwig | 106/315 |
| 2,620,279 | 12/1952 | Clark | 106/315 |
| 2,909,223 | 10/1959 | Kaveler | 106/115 |
| 3,057,742 | 10/1962 | Cunningham et al. | 106/115 |
| 3,215,549 | 11/1965 | Ericson | 106/111 |
| 3,753,354 | 8/1973 | Bauer | 61/45 B |
| 3,797,254 | 3/1974 | Askey et al. | 61/45 B |
| 3,980,487 | 9/1976 | Akabayashi et al. | 106/111 |

FOREIGN PATENT DOCUMENTS 1,312,904  4/1973  United Kingdom.

Primary Examiner—R. O. Dean
Assistant Examiner—John P. Sheehan
Attorney, Agent, or Firm—Cushman, Darby & Cushman

[57] ABSTRACT

A method of securing a fixing element such as a dowel in a drillhole in a rock mass wherein the element is grouted in position with calcium sulphate hemihydrate plaster (preferably alpha gypsum) gauged with a solution of a water-soluble salt of carboxy methyl cellulose.

8 Claims, No Drawings

METHOD OF SECURING FIXING ELEMENTS IN ROCK

This invention relates to a method of securing fixing elements in drillholes in rock masses. The method is applicable for anchoring bolts or other rod like elements in rock and it is especially useful in long hole dowel reinforcement of rock in tunnels and coal mines. The invention also includes pumpable compositions for use in the method and the method of preparing such compositions.

In the method of rock reinforcement which is widely practised in the coal mining industry, several coupled dowels, usually of wood and of solid or hollow split-timber construction having a total length of about twenty feet, are inserted into predrilled holes into which a grout, usually of a synthetic hardenable resin composition, is pumped. On setting the resin binds the timber dowels into the surrounding rock. In this manner several weak strata may be knitted together into a stronger composite beam. This technique is used for both tunnel roof and face support and has contributed to safer and more productive working of coal seams. A similar technique is employed to grout anchor bolts, for example for the attachment of roof support plates and other fixtures in mines. In the normal methods the resin is injected around the fixing element by pumping through a flexible loading tube.

Polyester resins and urea/formaldehyde (UF) resins have been successfully used in this application. Polyester resins are much stronger and would therefore be preferred to UF resins but they are inflammable and require chemicals to clean them from pumping equipment. UF resins in the ungelled state are easily soluble in water so that pump cleaning presents no problem, and are not readily flammable. However they have the serious disadvantage that, on burning, they evolve toxic gases comprising appreciable quantities of hydrogen cyanide and thus would be dangerous if they were involved in a fire at the working site.

It is an object of this invention to provide a method of grouting fixing elements in rock which does not involve the use of flammable or potentially toxic grouting compositions.

A widely used hardening material is gypsum plaster based on calcium sulphate hemihydrate but this has not found favour for grouting fixing elements in rock in mines. Indeed the properties of such plaster as normally used would be regarded as incompatible with the requirements of a suitable pumpable grout. Thus gypsum plasters are considered to be weak materials and therefore unlikely to give the required bond strength between the fixing element and the rock. They set too quickly to provide adequate time for pumping into position and, when formulated with sufficient gauging water for pumpability, they have impaired set strength. In addition these plasters are difficult to pump uniformly, mainly because the viscosity in the unset state is unstable and tends to increase rapidly and the unset plasters are not sufficiently thixotropic to prevent them from running out of upwardly inclined boreholes.

We have now found that calcium sulphate hemihydrate plasters containing water-soluble salt of carboxy methyl cellulose (CMC) as set retardant have a surprising combination of properties which render them particularly suitable as pumpable grouting compositions for grouting fixing elements in rock. The CMC salt permits plasters of pumpable viscosity to be formulated with a reduced quantity of gauging water, thereby retaining the set strength of the plaster. Low viscosity, smooth, consistent plasters can be formulated which have less drag and can be pumped surprisingly fast. The viscosity of the unset plaster can be precisely controlled by a variation of the retardant concentration and it remains low until near the setting time. An especially advantageous property of these plasters is their surprisingly improved thixotropy so that there is little flow after pumping is stopped and easily pumpable compositions will stay in place in upwardly directed boreholes. A further advantage is that the slight expansion which occurs on hardening of gypsum plasters is substantially maintained after hardening, whereas gypsum plasters normally shrink a little over a period of a few days after initial hardening. This ensures that the fixing elements are quickly bonded tightly to the surrounding rock and remain firmly in position thereafter.

This beneficial combination of properties is conferred only by the CMC salts and we have found that non-ionic cellulose ethers such as methyl cellulose, methyl hydroxyethyl cellulose or hydroxypropyl methyl cellulose, even is used in conjunction with protein retardant, do not confer the same benefits, although they may be beneficial in improving water retention as described hereinafter.

In accordance with this invention, a fixing element is secured in a drillhole in a rock mass by grouting with a plaster composition based on calcium sulphate hemihydrate gauged with an aqueous solution containing 0.01 to 3% w/v (i.e. percent in grams per 100 cc of water) of a water-soluble salt of carboxy methyl cellulose (CMC).

The invention also includes the aforedescribed plaster composition for use in the said method.

The grouting composition is preferably introduced into the drillholes by pumping and for easy pumping the grouting composition should preferably contain 35 to 45 parts by weight of gauging water per 100 parts of calcium sulphate hemihydrate.

The preferred kinds of calcium sulphate hemihydrate plasters are those of low porosity, for example those termed alpha gypsum and described in Kirk-Othmer, Encyclopedia of Chemical Technology, 2nd Edition, Volume 4 Page 23. These plasters require a lower quantity of gauging water and have higher set strengths than the more usual plasters, which are more porous and absorbent, and in addition they give especially smooth, consistent, easily pumpable compositions.

The preferred grade of CMC is a low viscosity grade, of which a 1% w/v aqueous solution has a viscosity of 20 to 80 centipoises at 20° C. The degree of substitution is preferably in the range from 0.5 to 1.2 carboxy methyl groups per glucose anhydride unit and preferably the Molecular Weight is in the range from 80,000 to 140,000. The preferred water-soluble salt is the sodium salt. The CMC may be mixed with the dry plaster or the wet plaster but it is preferred to dissolve it first in the gauging water and to gauge the plaster with the solution. For convenient working a hardening time of about 1½ to 2 hours after mixing of the plaster is desirable and this is achieved by using SCMC in amounts of 0.1 to 0.2% w/v (grams/100 cc) of the gauging water. If the gauging solution is to be stored before use it is beneficial to add, as a preservative, a biocide such as, for example benzisothiazolone.

The plaster composition may also include fillers in an amount up to 100 parts per 100 parts of calcium sulphate hemihydrate by weight. The fillers may comprise, for example, mineral clays, talc, blast furnace slag, glass, asbestos, chalk, ground limestone, quartz, pumice, portland cement, alumina cement, pozzolana cement, cellulosic fibre such as woodmeal and sawdust, or synthetic plastics fibre such as nylon fibre.

The paster is readily prepared by mixing the ingredients together by normal plaster mixing methods. The wet plaster slurry quickly develops thixotropy on standing but the original viscosity is easily restored by stirring. Some separation of water may occur on standing but any of this water which remains in contact with the plaster surface is reabsorbed during hardening. This water separation is, however, a disadvantage if the plaster is to be used in absorbent strata because the water loss can result in insufficient hydration of the hemihydrate with consequent improper setting of the plaster. The water separation can be reduced or prevented by dissolving in the gauging water, from 0.01 to 5.0% w/v of hydroxypropyl guar gum having a Molecular Weight in the range from 500,000 to 5,000,000 or non-ionic cellulose ether, for example hydroxypropyl methyl cellulose, methyl cellulose or methyl hydroxyethyl cellulose.

The invention is further illustrated by the following Examples in which parts and percentages are given by weight unless otherwise stated.

EXAMPLES 1-10

In the preparation of the plasters of these Examples 100 parts of calcium sulphate hemihydrate were gauged to a pumpable slurry with an aqueous solution of sodium carboxy methyl cellulose at 15° C. Details of the grades of calcium sulphate hemihydrate, the concentration and amount of gauging water, and the properties of the plasters are given in Table 1. In preparing the slurries the ingredients were mixed by stirring in a twin-blade paddle stirrer till a smooth consistent slurry was obtained.

The α-gypsum was calcium sulphate hemihydrate produced by calcining gypsum in an autoclave in an atmosphere of steam and consisted of roughly spherical non-porous particles of average diameter 0.5 to 1.5μ.

The calcium sulphate hemihydrate plaster used in Examples 9 and 10 was a normal absorbent plaster obtained by calcining gypsum at atmospheric pressure in a dry atmosphere and consisted of rod shaped particles having average length of 0.5 to 1.0μ and average diameter of 0.03 to 0.3μ.

The SCMC used was a quick dissolving granular grade having a degree of substitution of 0.7 and Molecular Weight of 80,000 to 140,000. In 1% w/v aqueous solution its viscosity was 50 centipoises at 15° C. The particles were of a size passing an 18 mesh BS sieve (0.855 mm) and retained on an 85 mesh BS sieve (0.18 mm).

Tensile strength tests were done 24 hours after initial hardening.

TABLE 1

| Example No | Grade of Calcium Sulphate Hemihydrate | Parts of gauging solution per 100 parts of α-gypsum | SCMC in gauging solution % w/v | Initial viscosity (cps) | Hardening time (minutes) | Tensile strength (kilo newtons/m$^2$) |
|---|---|---|---|---|---|---|
| 1 | α-gypsum | 28 | 0.14 | 8820 | 87 | 2800 |
| 2 | " | 33.3 | 0.14 | 3908 | 100 | 3550 |
| 3 | " | 39 | 0.14 | 1224 | 115 | 3550 |
| 4 | " | 44 | 0.14 | 428 | 160 | 1450 |
| 5 | " | 50 | 0.14 | 288 | 300 | 1300 |
| 6 | " | 39 | 0.10 | 928 | 96 | 3100 |
| 7 | " | 39 | 0.12 | 1148 | 104 | 2800 |
| 8 | " | 39 | 0.16 | 1108 | 170 | 2800 |
| 9 | Normal | 39 | 0.14 | 3700 | >450 | 3250 |
| 10 | " | 39 | 0.20 | 2040 | 210 | 3550 |

The properties of the plaster given in the Table show that the optimum tensile strength is obtained using 33–39 parts of gauging solution. The viscosity of the plaster slurry obtained using gauging solution containing 0.10 to 0.15 w/v of SCMC is sufficiently low and the hardening time is sufficiently delayed for the slurry to be pumped into drillholes as a grouting material for dowel reinforcement of rock. The α-gypsum slurry of Example 3 had lower viscosity than the normal plaster slurry of Example 9 and the α-gypsum plasters were also smoother and more consistent which also enhanced their pumpability.

Viscosity measurements were made on samples of the slurry of Example 3 at 15° C., at various times after mixing, using a Brookfield Viscometer (RVT model) (with a number 5 spindle at 100 revolutions per minute and rotating spindle for 2 minutes) and the following values were obtained.

TABLE 2

| Time After Mixing (minutes) | Viscosity at 15° C (cps) |
|---|---|
| 10 | 1224 |
| 20 | 1352 |
| 30 | 1448 |
| 60 | 1280 |
| 80 | 600 |
| 90 | 1148 |
| 100 | 1680 |
| 110 | 1132 |
| 115 | Plaster hardened |

These measurements show that the viscosity remained substantially constant almost until the plaster hardened. The set plaster had a tensile strength of 3,550 kilo newtons/m$^2$ and a compressive strength of 3,400 kilo newtons/m$^2$.

In a pumpability test the slurry of Example 3 was pumped through a 1.6 cm diameter × 8 m long PVC pipe using a pump at 2,040 kilo newtons/m$^2$ delivery pressure at a rate of 29 kg per minute.

Some of the plaster was pumped into a 5 cm diameter × 2.5 m metal pipe which was stoppered at one end and contained 2 coupled 2 m × 3.2 cm diameter timber dowels hollowed out along their length to accommodate a 1.6 cm diameter PVC delivery pipe. On setting, the plaster bonded the timber dowel tightly to the metal pipe.

In a test of anchorage strength in concrete, a 20 mm diameter high tensile steel bolt was grouted in a 17.8 cm × 3.5 cm diameter hole in a block of high density concrete (compressive strength 27,500 kilo newtons/m²) using the composition of Example 3 and pulled out by means of a hand-operated hydraulic jack. The axial pull required was 66 kilo newtons, i.e. 3.7 kilo newtons/cm of bond. This compares favourably with an anchorage strength of about 4 kilo newtons/cm obtained with polyester compositions and about 1.2 kilo newtons/cm obtained with urea/formaldehyde resin compositions.

EXAMPLE 11

100 parts of α-gypsum were mixed with 39 parts of aqueous gauging solution containing 0.10% w/v SCMC (as used in Example 1) and 0.05% w/v of hydroxy propylated guar gum till a smooth slurry was obtained. The hydroxy propylated guar gum had a Molecular Weight of 3,000,000 and a degree of substitution of 1.0. A 2% aqueous solution had a viscosity of 129,000 cps at 20° C.

There was no water separation from the slurry when it was allowed to stand before setting. The tensile strength of the set plaster was 35.50 kilo newtons/m².

Viscosity measurements were made on samples of the slurry by the method used in Example 1 and the values shown in Table 3 were obtained.

TABLE 3

| Time after Mixing (minutes) | Viscosity at 15° C (cps) |
|---|---|
| 10 | 3376 |
| 20 | 3372 |
| 30 | 3592 |
| 40 | 16100 |
| 50 | 31760 |
| 60 | 62880 |
| 80 | 64480 |
| 120 | Plaster hardened |

The viscosity was maintained at a constant low value only for about 30 minutes and rose rapidly thereafter.

EXAMPLE 12

100 parts of α-gypsum were mixed with 39 parts of aqueous gauging solution containing 0.15% w/v SCMC and 0.15% w/v of hydroxypropyl methyl cellulose. The hydroxypropyl methyl cellulose had a Molecular Weight of 60,000, a degree of substitution of 1.5 for methyl groups and 0.3 for hydroxypropyl groups and the viscosity of a 2% aqueous solution at 20° C. was 50 cps.

The variation of the plaster viscosity with time is shown in Table 4.

TABLE 4

| Time after Mixing (minutes) | Viscosity at 20° C (cps) |
|---|---|
| 10 | 1580 |
| 20 | 2100 |
| 30 | 2240 |
| 40 | 2020 |
| 50 | 2540 |
| 60 | 2700 |
| 70 | 2800 |
| 80 | 3260 |
| 90 | 3980 |
| 200 | Plaster hardened |

EXAMPLES 13–19

In these Examples α-gypsum was mixed with various fillers and gauging solution as used in Examples 1 to 5, the amounts of filler and gauging water being adjusted so as to give slurries of viscosity 1,000 to 2,500 cps at 15° C. Details of the composition and properties of the plasters are given in Table 5.

TABLE 5

| Example No | Type of filler | Parts filler/100 parts plaster | Parts solution/100 parts plaster | Initial viscosity (cps) | Hardening time (minutes) | Tensile strength (kilo newtons/m²) |
|---|---|---|---|---|---|---|
| 13 | China clay | 30 | 65 | 1240 | 109 | 1250 |
| 14 | Power Station ash | 30 | 45 | 1192 | 57 | 1550 |
| 15 | Ground limestone | 60 | 50 | 1080 | 77 | 1850 |
| 16 | Talc | 30 | 45 | 1416 | 76 | 1850 |
| 17 | Bentonite | 15 | 55 | 888 | 105 | 620 |
| 18 | Portland cement | 60 | 55 | 2440 | 38 | 1550 |
| 19 | Glass fibre (6 mm long) | 5 | 40 | 1220 | 84 | 2150 |

These results show that, whilst it is possible to add large quantities of filler without excessive reduction of the hardening time, the use of the filler increases the requirement of gauging water and markedly weakens the set plaster.

EXAMPLE 20

In this Example the plaster composition of Example 3 was used in a coal mine as grouting material for wooden dowels inserted in drillholes to reinforce a faulted 1.53 m thick coal seam.

Two holes of 4.3 cm diameter spaced 92 cm apart were drilled horizontally at right angles to the face to a depth of 7.3 m. Four lengths of wooden dowel each 1.8 m long × 3.5 cm diameter, joined together at the ends by step joints were inserted into each hole to lie flush with the hole mouth. The dowels were recessed along their length and a polythene slurry delivery tube having an external diameter of 1.9 cm and an internal diameter of 1.59 cm, accommodated and secured by adhesive tape in the recess, extended along the length of the dowels to provide a connection for injecting the plaster slurry. A further two holes were drilled at right angles to the face and at an angle of 30° upwardly from the horizontal to a depth of 3.6 m from two points on the face positioned respectively 30.5 cm vertically above the previous holes. Two stepped end-joined recessed dowels identical to the dowels described above and also provided with a polythene delivery tube secured in the recess were inserted into each of the further holes.

Freshly prepared plaster slurry composition as prepared in Example 3 was pumped by a ram pump through the delivery tubes at a rate 4.5 to 9 liters per minute until the space around each dowel was filled and slurry emerged from the hole mouth.

When the pumping was stopped there was negligible further exudation of slurry from the holes. The protruding polythene tubing was cut away and the holes were sealed with a small plug of stemming composition to prevent any displacement of the dowels or plaster. The plaster hardened after two hours and bonded the dowels firmly in position. The rock mass around the drill-holes was thereby strengthened sufficiently to allow the coal seam to be undercut and blasted in the usual manner.

What we claim is:

1. A method of securing a fixing element in a drillhole in a rock mass comprising grouting the element by pumping into the drillhole a plaster composition based on calcium sulphate hemihydrate comprising α-gypsum gauged with an aqueous solution containing 0.01 to 3% w/v of water-soluble salt of carboxy methyl cellulose (CMC), the grouting composition containing sufficient water to render the composition pumpable.

2. A method as in claim 1 wherein the water-soluble CMC salt is such that a 1% w/v aqueous solution has a viscosity of 20 to 80 centipoises at 20° C.

3. A method as in claim 1 wherein the CMC salt has a degree of substitution of 0.5 to 1.2.

4. A method as in claim 1 wherein the CMC salt has a molecular weight in the range from 80,000 to 140,000.

5. A method as in claim 1 wherein the CMC salt is a sodium salt (SCMC).

6. A method as in claim 5 wherein the gauging water comprises SCMC in amounts in the range from 0.1 to 0.2% w/v.

7. A method as in claim 1 wherein the plaster composition comprises filler in an amount up to 100 parts per 100 parts of calcium sulphate hemihydrate by weight.

8. A method as in claim 7 wherein the filler is selected from the group consisting of mineral clay, talc, blast furnace slag, glass, asbestos, chalk, ground limestone, quartz, pumice, portland cement, alumina cement, pozzolana cement, cellulosic fibre and synthetic plastics fibre.

* * * * *